United States Patent
Ochiai et al.

(10) Patent No.: US 9,861,084 B2
(45) Date of Patent: Jan. 9, 2018

(54) ROTOR FOR A SPINNING REEL FOR FISHING

(71) Applicant: Shimano Inc., Sakai, Osaka (JP)

(72) Inventors: Koji Ochiai, Osaka (JP); Takuji Takamatsu, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/384,948

(22) Filed: Dec. 20, 2016

(65) Prior Publication Data

US 2017/0208786 A1    Jul. 27, 2017

(30) Foreign Application Priority Data

Jan. 25, 2016  (JP) ................................ 2016-011943

(51) Int. Cl.
*A01K 89/01*    (2006.01)

(52) U.S. Cl.
CPC .... *A01K 89/01081* (2015.05); *A01K 89/0108* (2013.01); *A01K 89/01085* (2015.05)

(58) Field of Classification Search
CPC .............. A01K 89/01; A01K 89/01081; A01K 89/01082
See application file for complete search history.

(56) References Cited

U.S. PATENT DOCUMENTS

| | | |
|---|---|---|
| 2,971,720 A | 2/1961 | Wood |
| 4,279,387 A * | 7/1981 | Morimoto .............. A01K 89/01 242/232 |
| 5,350,129 A | 9/1994 | Furomoto et al. |
| 5,601,244 A | 2/1997 | Kawabe et al. |
| 5,673,868 A | 10/1997 | Takeuchi |
| 5,820,053 A * | 10/1998 | Takeuchi ........... A01K 89/0108 242/231 |
| 2002/0175236 A1* | 11/2002 | Hitomi ................... A01K 89/01 242/230 |

(Continued)

FOREIGN PATENT DOCUMENTS

| | | |
|---|---|---|
| JP | 2006-101704 A | 4/2006 |
| JP | 2011-177068 A | 9/2011 |

OTHER PUBLICATIONS

Partial European Search Report of corresponding EP patent Application No. 17 15 2905.0 dated Jun. 14, 2017.

*Primary Examiner* — Emmanuel M Marcelo

(74) *Attorney, Agent, or Firm* — Global IP Counselors, LLP

(57) ABSTRACT

A rotor for a spinning reel for fishing, includes a cylindrical portion, a first rotor arm, a second rotor arm and a reinforcement portion. The cylindrical portion has a rear end opening that is open. The first rotor arm extends forward from an outer peripheral portion of the cylindrical portion and configured to couple to a first bail support portion including a line roller. The second rotor arm is at a position opposing the first rotor arm, extending forward from the outer peripheral portion of the cylindrical portion, and configured to couple to a second bail support portion holding an end of a bail that extends from the first bail support portion. The reinforcement portion has a wall portion that is thicker than a surrounding portion, and is disposed on an inner peripheral portion of the cylindrical portion in a position at which the first rotor arm is disposed.

9 Claims, 10 Drawing Sheets

(56) References Cited

U.S. PATENT DOCUMENTS

| | | | | |
|---|---|---|---|---|
| 2003/0146325 | A1* | 8/2003 | Kitajima | A01K 89/01 242/311 |
| 2006/0266861 | A1* | 11/2006 | Kitajima | A01K 89/01 242/322 |
| 2008/0149750 | A1* | 6/2008 | Kitajima | A01K 89/01 242/224 |
| 2011/0174909 | A1* | 7/2011 | Shibata | A01K 89/01 242/230 |
| 2015/0048193 | A1* | 2/2015 | Matsuo | A01K 89/0114 242/309 |
| 2015/0157000 | A1* | 6/2015 | Hiraoka | A01K 89/01 242/234 |
| 2015/0373961 | A1* | 12/2015 | Horie | A01K 89/01 242/234 |

* cited by examiner

ROTOR FOR A SPINNING REEL FOR FISHING

CROSS-REFERENCE TO RELATED APPLICATIONS

This application claims priority based on Japanese Patent Application No. 2016-011943, filed in the Japan Patent Office on Jan. 25, 2016, the contents of each of which are hereby incorporated herein by reference.

BACKGROUND

Field of the Invention

The present invention relates to a rotor for a spinning reel for fishing.

Background Information

A spinning reel for fishing can include a spool, a rotor that includes a pair of rotor arms, and a fishing line guiding mechanism that is pivotally mounted to distal ends of the pair of rotor arms (for example, Japanese Published Unexamined Application No. 2006-101704). The fishing line guiding mechanism is a mechanism for guiding the fishing line onto the spool. The fishing line guiding mechanism comprises a bail, a pair of bail support members that support two ends of the bail, and a line roller.

Since a large load can be applied to the rotor arm, etc., when a fishing line with a fish caught thereon is wound by turning the handle, it is necessary for the rotor to have a degree of strength that avoids deformation and breakage. In addition, it is desirable for the rotor to have good rotational balance and to be as light as possible in order to improve user comfort.

For example, Japanese Laid-Open. Patent Publication No. 2011-177068 discloses a rotor for a spinning reel for fishing, in which the rotor arm part is reinforced and a substantially annular reinforcing member is provided, in order to reduce the weight of the entire rotor.

SUMMARY

In the rotor disclosed in the Japanese Laid-Open Patent Publication No. 2011-177068, a substantially annular reinforcing member is disposed between the two rotor arms. This reinforcing member is newly added only for reinforcement. Providing such a reinforcing member leads to an increase in cost, and also generates incongruity in the outer appearance. Accordingly, a rotor for a spinning reel for fishing that is lightweight and has a good rotational balance, in which the strengths of the existing structural members are increased, is desired.

The present invention was made in order to solve the problem described above, and an object thereof is to provide a rotor for a spinning reel for fishing that is lightweight and has good rotational balance, in which the strengths of the existing structural members are increased.

A rotor for a spinning reel for fishing according to the present invention comprises, a cylindrical portion in which a rear end opening, a first rotor arm extending forwardly from an outer peripheral portion of the cylindrical portion and coupled to a first bail support portion comprising a line roller, a second rotor arm, disposed at a position opposing the first rotor arm, extending forwardly from the outer peripheral portion of the cylindrical portion and coupled to a second bail support portion that holds the other end of the bail that extends from the first bail support portion, and a first reinforcement portion with a thicken wall than the surroundings, disposed on an inner peripheral portion of the cylindrical portion at a position at which the first rotor arm is disposed.

Preferably, an inner radius of the first reinforcement portion is smaller than an inner radius of the cylindrical portion.

Preferably, the first reinforcement portion is formed symmetrically in the circumferential direction of the cylindrical portion.

A rotor for a spinning reel for fishing according to the present invention comprises a cylindrical portion in which a rear end opening, a first rotor arm extending forwardly from an outer peripheral portion of the cylindrical portion and coupled to a first bail support portion comprising a line roller, a second rotor arm, disposed at a position opposing the first rotor arm, extending forwardly from the outer peripheral portion of the cylindrical portion and coupled to a second bail support portion that holds the other end of the bail that extends from the first bail support portion, and a second reinforcement portion extending inclined with respect to a cylinder axis direction of the cylindrical portion, on a side surface of the cylindrical portion.

Preferably, an opening is disposed in a position adjacent to the second reinforcement portion on the side surface of the cylindrical portion.

Preferably, two of the second reinforcement portions are formed in plane symmetry with respect to a surface comprising the cylinder axis.

A rotor for a spinning reel for fishing according to the present invention comprises a cylindrical portion in which a rear end opening, a first rotor arm extending forwardly from an outer peripheral portion of the cylindrical portion and coupled to a first bail support portion comprising a line roller, a second rotor arm, disposed at a position opposing the first rotor arm, extending forward from an outer peripheral portion of the cylindrical portion, and coupled to a second bail support portion that holds the end of the bail that extends from the first bail support portion, and a third reinforcement portion that extends from at leak one side of the first rotor arm.

Preferably, the first rotor arm comprises two support legs, the third reinforcement portion extends from a side of each of the two support legs to the outer peripheral portion of the cylindrical portion, and the cross section is configured in an L-shape, along with the support legs.

Preferably, a bail reversing device that directs the bail to a line winding position or a line casting position is provided, and the bail reversing device is disposed inside the second rotor arm.

The present invention is directed to a rotor for a spinning reel for fishing that is lightweight and has a good rotational balance, in which the strength of the existing structural members are increased.

BRIEF DESCRIPTION OF THE DRAWINGS

Referring now to the attached drawings which form a part of this original disclosure.

DETAILED DESCRIPTION OF THE EMBODIMENTS

Embodiment 1

Figure 1:
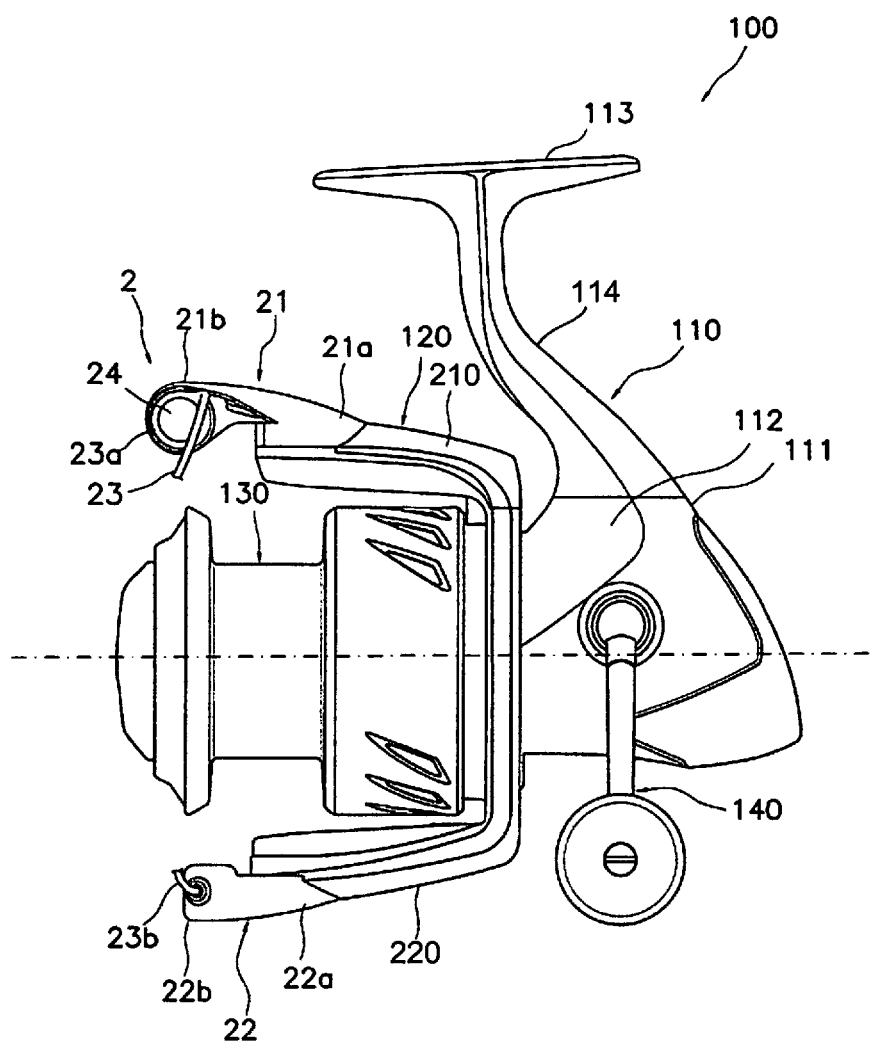
FIG. 1 is an overall side view of a spinning reel for fishing according to a first embodiment of the present invention.
Figure 2:
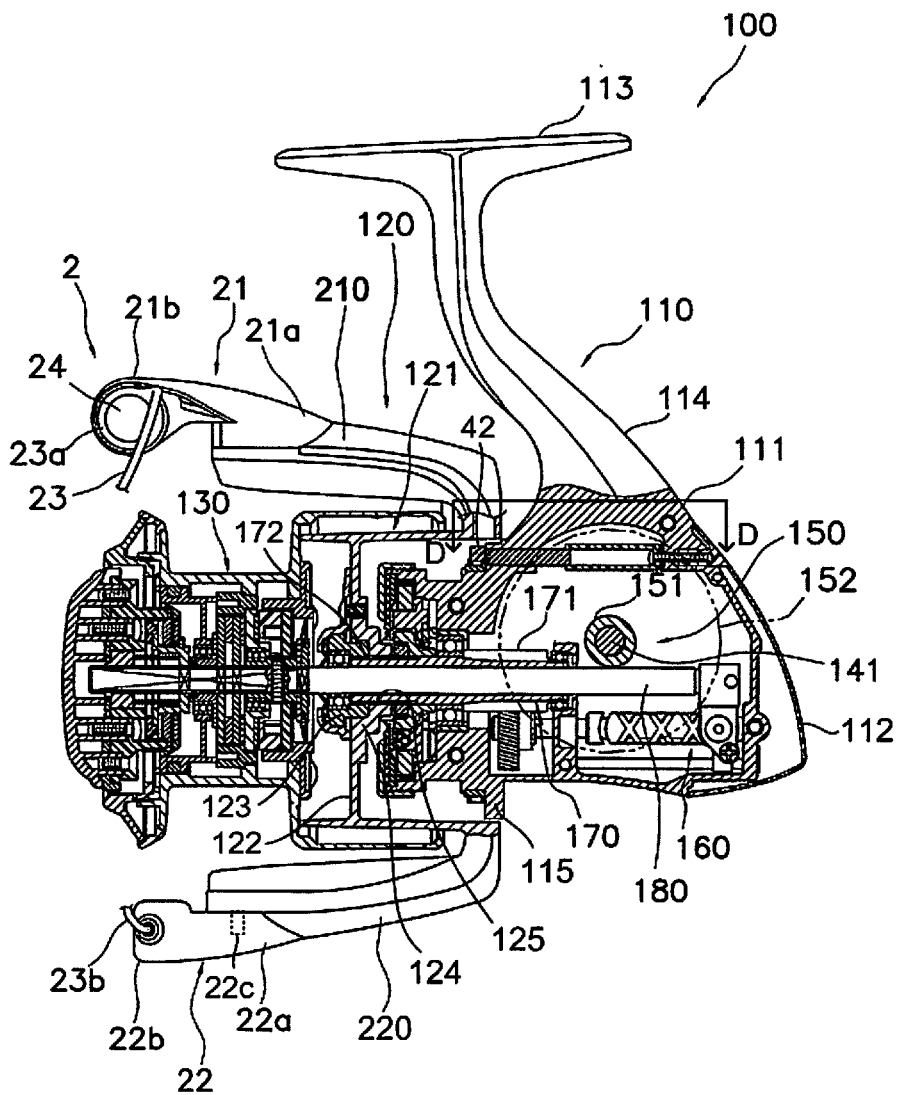
FIG. 2 is a cross-sectional view of the spinning reel for fishing shown in FIG. 1.

The spinning reel for fishing according to the first embodiment of the present invention will be described, with reference to the drawings. In the following description, "front (ward)" indicates the direction in which the fishing line is unreeled; specifically, left in FIG. 1 and FIG. 2 is the "front (ward)" direction. The opposite direction thereof is referred to as "rear (ward)". In addition, the material of each member is not limited to the examples; well-known materials having the necessary function and durability may be appropriately used.

As shown in FIG. 1, the spinning reel 100 for fishing comprises a reel body 110, a rotor 120, a spool 130, a handle 140, and a fishing line guiding mechanism 2. Further, as shown in FIG. 2, the spinning reel 100 for fishing further comprises a drive mechanism 150, an oscillating mechanism 160, a pinion gear 170, and a spool shaft 180.

As shown in FIG. 1, the reel body 110 comprises a case part 111 and a lid portion 112. The lid portion 112 can be detached from the case part 111. In addition, a rod mounting stage support portion 114 is formed extending from the case part 111, and a rod mounting stage 113 is disposed at the distal end of the rod mounting stage support portion 114. The rod mounting stage 113 is a portion that is mounted to the fishing rod.

As shown in FIG. 2, the reel body 110 comprises an internal space that is defined by the case part 111 and the lid portion 112, and houses various mechanisms in the internal space. In particular, the drive mechanism 150 and the oscillating mechanism 160 are housed in the reel body 110.

The drive mechanism 150 comprises a drive shaft 151 and a drive gear 152. The drive shaft 151 is coupled to a handle shaft 141 and is integrally rotatable with the handle shaft 141.

The drive gear 152 is coupled to the drive shaft 151, and is integrally rotatable with the drive shaft 151. The drive gear 152 is a face gear and meshes with the gear portion 171 of the pinion gear 170. The drive shaft 151 and the drive gear 152 are rotated by rotating the handle 140 that is mounted to the side surface, of the reel body 110, and the pinion gear 170 is also rotated.

The pinion gear 170 is disposed in the reel body 110. The pinion gear 170 is formed in a tubular shape, and the spool shaft 180 extends through the inside of the pinion gear 170. The pinion gear 170 is rotatably disposed around the spool shaft 180. The pinion gear 170 is supported in the reel body 110 via a plurality of axle bearing members.

The spool shaft 180 extends forward from inside the reel body 110. The spool shaft 180 is reciprocated in the longitudinal direction by rotating the handle 140. In particular, the rotation of the handle 140 rotates the pinion gear 170 via the drive gear 152. Accompanying the rotation of the pinion gear 170, the oscillating mechanism 160 reciprocates the spool shaft 180 in the longitudinal direction.

The spool 130 is a member on which the fishing line can be wound. The spool 130 is supported on the distal end portion of the spool shaft 180. The spool 130 is integrally reciprocated with the spool shaft 180 in the longitudinal direction.

The rotor 120 is a member for winding the fishing line onto the spool 130. The rotor 120 is rotatably supported on the reel body 110 via the pinion gear 170. Specifically, the rotor 120 is fixed to the front portion 172 of the pinion gear 170, and is integrally rotated with the pinion gear 170. The rotor 120 comprises a rotor body (cylindrical portion) 121, a first rotor arm 210, and a second rotor arm 220. The detailed structure of the rotor 120 will be described later.

Figure 3:
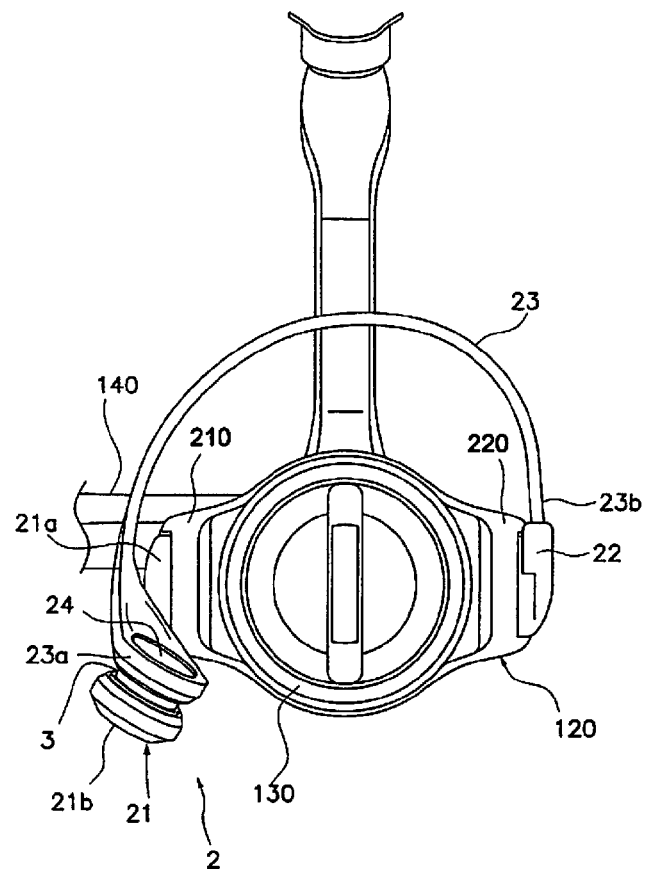
FIG. 3 is a front view of the spinning reel for fishing shown in FIG. 1.

As shown in FIGS. 1-3, the fishing line guiding mechanism 2 is a mechanism for guiding the fishing line onto the spool 130. The fishing line guiding mechanism 2 is attached across the distal end portions of the first rotor arm 210 and the second rotor arm 220.

This fishing line guiding mechanism 2 comprises a first bail support portion 21, a second bail support portion 22, a bail 23, a support shaft 24, and a line roller 3. The fishing line guiding mechanism 2 is pivotably mounted to assume the line winding position in which the handle 140 is turned to wind the fishing line onto the spool 130, and the line casting position in which the fishing line is unreeled in forward from the spool 130

The first bail support member 21 is made of zinc, and is pivotably mounted to the first rotor arm 210. Specifically, the first bail support member 21 is pivotably mounted to the outside of the front end portion of the first rotor arm 210.

The second bail support member 22 is made of zinc, and is pivotably mounted to the second rotor arm 220. Specifically, the second bail support member 22 is pivotably mourned to the outside of the front end portion of the second rotor arm 220.

Figure 4:
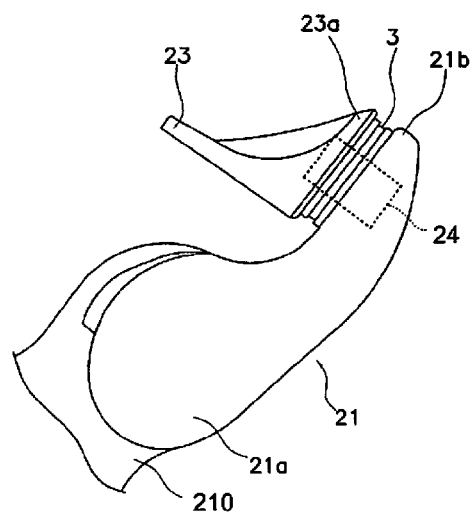
FIG. 4 is a partially enlarged view of the fishing line guiding mechanism of the spinning reel for fishing shown in FIG. 1.

As shown in FIG. 4, the first bail support member 21 comprises a first end portion 21a and a second end portion 21b. The first end portion 21a is pivotably mounted to the first rotor arm 210. The second end portion 21b of the first bail support member 21 supports the first end portion 23a of the bad 23 via the support shaft 24.

As shown in FIG. 1 and FIG. 2, the second bail support member 22 comprises a first end portion 22a and a second end portion 22*b*. The first end portion 22*a* is pivotably mounted to the second rotor arm 220. The second end portion 22*b* supports the second end portion 23*b* of the bail 23.

As shown in FIG. 3, the bail 23 is a member that is curved in a substantially U-shape and made of, for example, stainless steel alloy. The bail 23 is curved to protrude outwards along the outer peripheral portion surface of the spool 130. The first end portion 23*a* of the bail 23 is supported on the first bail support portion 21 via the support shaft 24.

Further, the second end portion 23*b* of the bail 23 is supported on the second bail support portion 22. When the fishing line guiding mechanism 2 is in the line winding position, the bail 23 guides the fishing line onto the line roller 3 via the first end portion 23*a*. The line roller 3 is a member for guiding the fishing line onto the spool 130 of the spinning reel 100 for fishing. When the handle 140 is manually turned when the fishing line guiding mechanism 2 is in the line winding position, the rotor 120 is rotated and the fishing line is wound onto the spool 130 via the line roller 3.

The overall configuration of the spinning reel 100 for fishing is described above. Details of the rotor 120 will be described next.

Figure 5A:
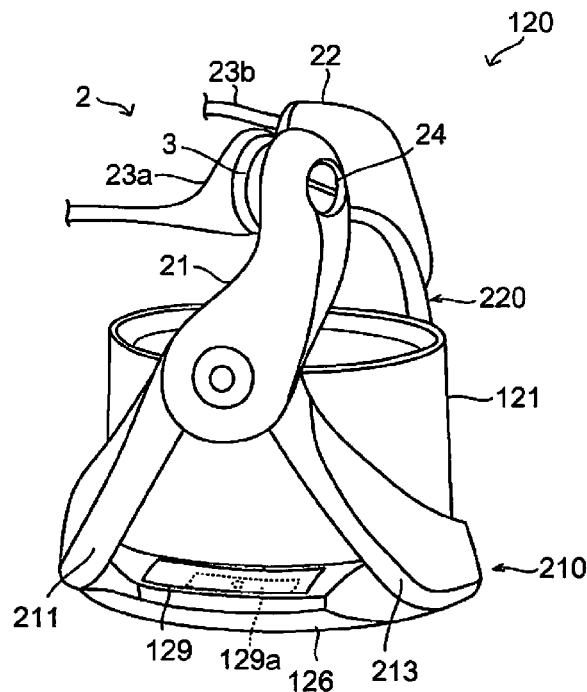
FIG. 5A is a perspective view of a rotor comprising the fishing line guiding mechanism of the spinning reel for fishing shown in FIG. 1, as seen from the first rotor arm side.
Figure 5B:
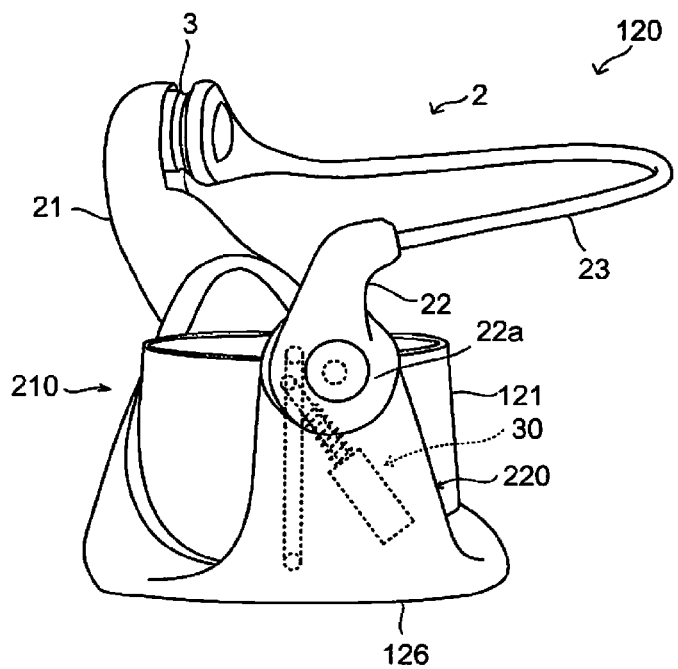
FIG. 5B is a perspective view seen from the second rotor arm side.

As shown in FIGS. 5A and 5B, the rotor 120 comprises a rotor body 121, a first rotor arm 210, and a second rotor arm 220. In FIGS. 5A and 5B, the vertical direction of the drawing is the longitudinal direction of the spinning reel 100.

Figure 6A:
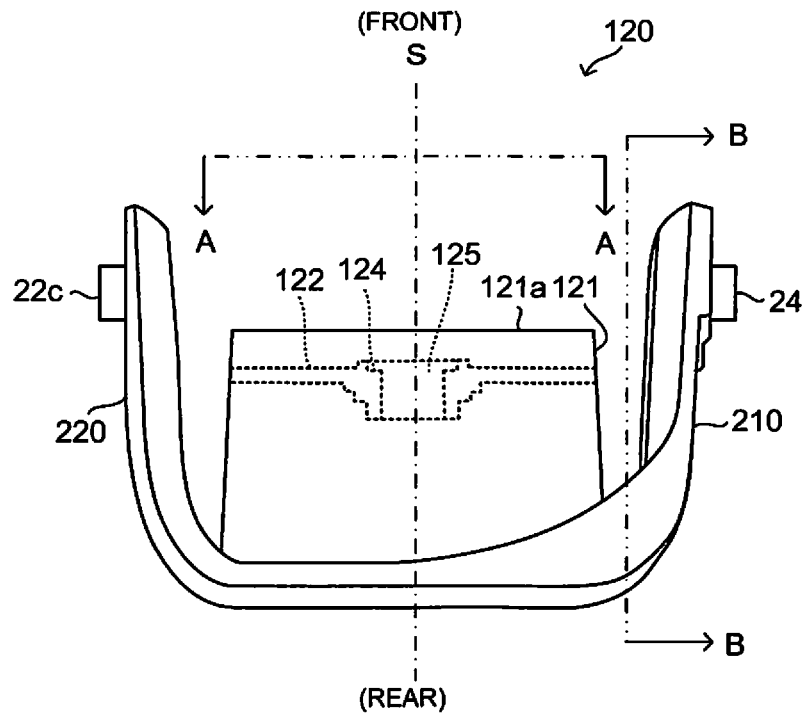
FIG. 6A is a side view of the rotor shown in FIGS. 5A and 5B.
Figure 6B:
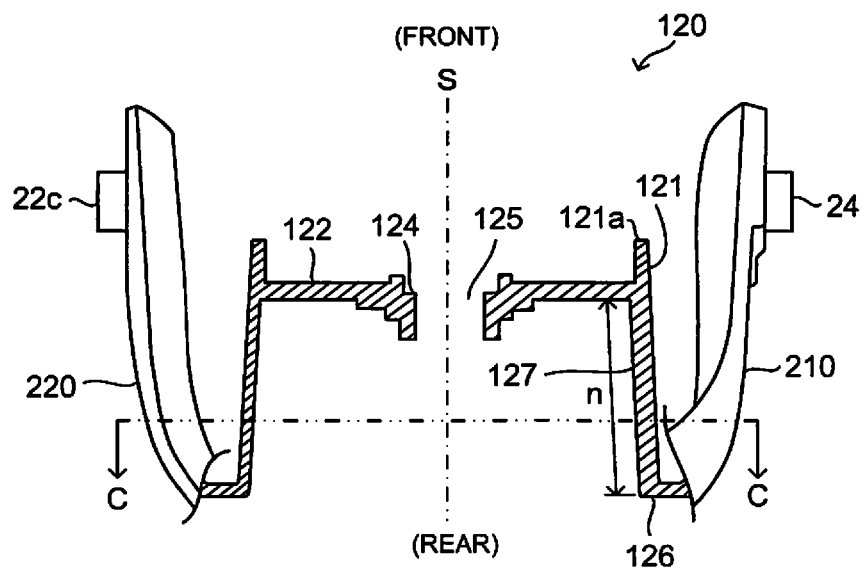
FIG. 6B is a schematic cross sectional view taken along line A-A in FIG. 6A showing the cross section of the rotor body portion.

The rotor body portion 121 of the rotor 120 will be described using FIGS. 6A and 6B and FIG. 7. As shown in FIGS. 6A and 6B, the rotor body portion 121 comprises a cylindrical shape that extends longitudinally, in which the diameter is slightly reduced toward the front. As shown in FIG. 6B, the rear end opening 126 of the rotor body portion 121 is open. The outer peripheral portion of the rear end opening 126 protrudes as a flange around the entire peripheral portion to increase the strength so as to be capable of supporting the first rotor arm 210 and the second rotor arm 220. In FIGS. 6A and 6B, the vertical direction of the drawing is the longitudinal direction of the spinning reel 100.

A disk portion 122 having a surface that is perpendicular to the cylinder axis (center axis of the cylinder) S of the rotor body portion 121 is formed on the inner side of the rotor body portion 121 slightly retracted from the front end 121*a*. A boss portion 124 is formed in the center of the disk portion 122. A circular through-hole 125 is formed in the central portion of the boss portion 124, and the front 172 of the above-described pinion gear 170, as well as the spool shaft 180, extend through the through-hole 125.

As shown in FIG. 2, the rotor 120 is fixed to the front 172 of the pinion gear 170 by a nut 123, at the front of the disk portion 122. When the user turns the handle 140, the drive gear 152 is rotated, and the pinion gear 170 meshed with the drive gear 152 and disposed around the spool shaft 180 is rotated. Then, the rotor 120 is rotated along with the rotation of the pinion gear 170.

Returning to FIG. 6B, a thick-walled portion 127 (first reinforcement portion) with a thicker wall than the surroundings (other positions) is disposed on the inner side of the rotor body portion 121 in the cylinder axis S direction, in a position to which the first rotor arm 210 is formed, which is rearward of the disk portion 122. The shape of the thick-walled portion 127 is rectangular having sides that are substantially parallel to the cylinder axis S.

Figure 7:
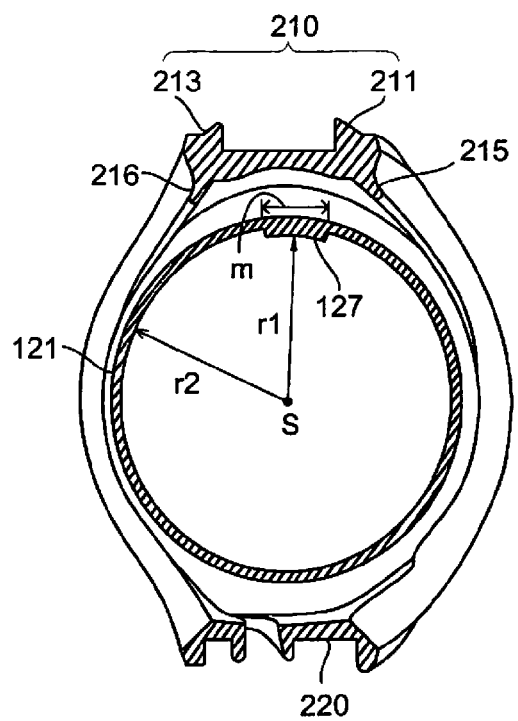
FIG. 7 is a cross sectional view taken along line C-C of FIG. 6B.

As shown in FIG. 7, the circumferential position of the thick-walled portion 127 preferably overlaps the circumferential position of the first rotor arm 210 from the point of view of strength and rotational balance. For example, the central position of the first rotor arm 210 in the circumferential direction preferably matches the central position of the thick-walled portion 127 in the circumferential direction. Similarly, for reasons of strength and rotational balance, the shape of the thick-walled portion 127 is preferably line-symmetrical in the circumferential direction. Line-symmetrical in the circumferential direction here means that the left and right of the rotor body portion 121 in the circumferential direction is line-symmetrical, with respect to a virtual line in the cylinder axis S direction.

The radius r1 of the inner surface of the thick-walled portion 127 (the distance from the cylinder axis S of the rotor body portion 121 to the inner surface of the thick-walled portion 127, inner radius) is smaller than the inner radius r2 of the other positions of the rotor body portion 121. That is, while the outer diameter of the rotor body portion 121 is the same for the thick-walled portion 127 and the other positions, the thick-walled portion 127 is formed protruding in the radially inward direction such that the thickness is increased compared to the other positions of the rotor body portion 121.

The circumferential width m of the thick-walled portion 127 is smaller than the length between the positions where the first support leg 211 and the second support leg 213 are extended. However, the circumferential width of the thick-walled portion 127 may be formed to be larger than the length between the positions where the first support leg 211 and the second support leg 213 are extended. While it is a trade-off between strength and weight, the radial thickness (wall thickness) of the thick-walled portion 127 is preferably about 1.5 to 3 times the wall thickness of the cylinder of the rotor body portion 121 besides the thick-walled portion 127. The length n of the thick-walled portion 127 in the cylinder axis S direction (refer to FIG. 6B) is preferably the total length from the rear end opening (open end) 126 of the rotor body portion 121 to the disk portion 122, but may be shorter than this.

Loads are applied to the rotor body portion 121 in the respective positions at which the first rotor arm 210 and the second rotor arm 220 are attached. In particular, since a first bail support portion 21 having a line roller 3 that guides the fishing line is attached to the first rotor arm 210, the first rotor arm 210 side of the rotor body portion 121 receives the tensile force of the fishing line and a large load is applied thereto. Accordingly, a thick-walled portion 127 is provided, in which the wall thickness of the cylinder of the rotor body portion 121 is increased at the position at which the first rotor arm 210 is attached, in order to increase the structural strength against the load. Then, the wall thickness of the cylinder at the other positions of the rotor body portion 121 is formed thinner than the thickness of a case in which the thick-walled portion 127 is not provided and the entire cylinder of the rotor body portion 121 is formed to have a uniform thickness. As a result, it is possible to further reduce the weight of the entire rotor body portion 121 while maintaining the necessary structural strength.

The shape of the thick-walled portion 127 is rectangular, but the shape does not necessarily have to be rectangular. For example, the circumferential width of the thick-walled portion 127 may be different between the rear end and the front end. However, it is preferable from the point of strength and rotational balance that the shape is symmetrical in the circumferential direction The thick-walled portion 127 may be integrally formed with the rotor body portion 121, or formed by producing separately from the rotor body portion 121 and being subsequently attached to the rotor body portion 121. Further, when separately forming the thick-walled portion 127 and the rotor body portion 121, the materials thereof may be varied. For example, a material with a greater material strength than the rotor body portion 121 may be used for the thick-walled portion 127.

Meanwhile, a thick-walled portion 127 is not formed in the rotor body portion 121 on the second rotor arm 220 side. However, a thick-walled portion 127 may also be formed in the rotor body portion 121 on the second rotor arm 220 side. In this case as well, the thickness should be determined such that the rotation is balanced, giving consideration to the weight of the first rotor arm 210 side and the thickness of the rotor body portion 121.

As shown in FIGS. 5A and 5B, a balance adjustment unit 129 for adjusting the rotational balance is provided in the rear end opening 126 of the rotor body portion 121 on the first rotor arm 210 side. The balance adjustment unit 129 is capable of, for example, screw-fixing the necessary number of, for example, small metal plate members 129a (weight material for adjustment, balance).

The first bail support portion 21 and the second bail support portion 22 are, for example, made of cast zinc, but the weights thereof are likely to vary from the designed weight values. If the weights vary, there is the possibility that a rotational balance cannot be achieved. In such a case, it is possible to adjust the rotational balance by attaching the necessary number of plate members 129a for balancing the rotation.

Details of the first rotor arm 210 and the second rotor arm 220 will be described next. As shown in FIGS. 5A and 5B and FIGS. 6A and 6B, the first rotor arm 210 and the second rotor arm 220 respectively extend radially outwardly from the outer peripheral portion of the rear end opening 126 of the rotor body portion 121, and further extend away from the rotor body portion 121 toward the front. The first rotor arm 210 and the second rotor arm 220 are disposed in opposite positions (facing each other) in the circumferential direction of the rotor body portion 121. The rotor body portion 121, the first rotor arm 210, and the second rotor arm 220 are made of, for example, aluminum alloy or magnesium alloy.

As shown in FIG. 5A, the first rotor arm 210 comprises a flat plate-shaped first support leg 211 and a flat plate-shaped second support leg 213. The first support leg 211 and the second support leg 213 respectively extend radially outwardly from the outer peripheral portion of the rear end opening 126 of the rotor body portion 121, and further extend away toward the front while being curved. The first support leg 211 and the second support leg 213 are closer to each other toward the front, and are merged at the front end portion. A space is formed between the first support leg 211 and the second support leg 213. The first bail support portion 21 is coupled to the front end portion of the first rotor arm 210.

Figure 8:
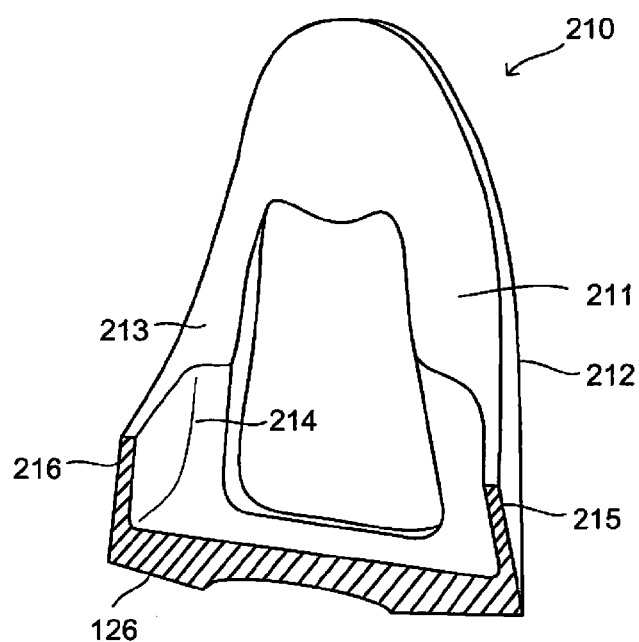
FIG. 8 is a cross sectional view taken along line B-B of FIG. 6A.

As shown in FIG. 8, the first rotor arm 210 comprises a first rib 215 (third reinforcement portion) that extends from the side (side end portion) 212 of the first support leg 211. The first rib 215 extends to the outer peripheral portion of the rotor body portion 121 (outer peripheral portion of the rear end opening 126). Further, the first rotor arm 210 comprises a second rib 216 (third reinforcement portion) that extends from the side (side end portion) 214 of the second support leg 213. The second rib 216 extends to the outer peripheral portion of the rotor body portion 121 (outer peripheral portion of the rear end opening 126).

As shown in FIG. 8, the first rib 215 is formed in a substantially perpendicular direction with respect to the first support leg 211, from the side 212 thereof. That is, the strength of the first support leg 211 is increased by forming an L-shaped cross sectional structure with the first support leg 211 and the first rib 215. Similarly, the second rib 216 is formed in a substantially perpendicular direction with respect to the second support leg 213, from the side 214 thereof. That is, the strength of the second support leg 213 is increased by forming an L-shaped cross sectional structure with the second support leg 213 and the second rib 216.

In a conventional rotor arm, a plate-like member extends radially outwardly from the rear end opening 126 of the rotor body portion 121, and further extends forward while being curved. However, a rib that extends from the plate-like member in a perpendicular direction (such that the cross section becomes an L-shape) is not provided, and strength is ensured as a single wide, thick, plate-like member. In contrast, in the first rotor arm 210 according to the first embodiment, the weight of the entire first rotor arm 210 is reduced while maintaining the strength by respectively combining a first rib 215 and a second rib 216 to a thinly formed, plate-like first support leg 211 and second support leg 213.

The reason for forming the first rotor arm 210 from two support legs, the first support leg 211 and the second support leg 213, is to reduce the weight of the component members of the first rotor arm 210 as much as possible. In addition, the reason for providing a first rib 215 to the first support leg 211 and a second rib 216 to the second support leg 213 is to maintain the necessary strength by respectively reinforcing the first support leg 211 and the second support leg 213. According to such a configuration, it is possible to reduce the weight more compared to the case in which the first rotor arm 210 is formed of a single wide, thick, support leg, as well as to ensure the necessary strength. Meanwhile, since a bail reversing device 30 (described later) is not disposed on the first rotor arm 210, it is easier to employ such a configuration. The number of support legs may be three or more.

On the other hand, as shown in FIG. 5B, the second rotor arm 220 extends thick-walled radially outwardly from the rear end opening 126 of the rotor body portion 121 in a position that opposes the first rotor arm 210 (positioned symmetrically with respect to the cylinder axis S), and further extends forward (substantially parallel to the rotor body portion 121) while being curved. The second rotor arm 220 is formed to be wide at the extended portion (base portion), and formed such that the width becomes narrower toward the front end. The second bail support portion 22 is coupled to the front end portion of the second rotor arm 220.

As shown by the dotted line in FIG. 5B, a bail reversing device 30 is disposed inside the portion of the second rotor arm 220 that extends forward. As described above, the fishing line guiding mechanism 2 of the spinning reel 100 for fishing can assume a line winding position, in which the fishing line is wound to the spool 130, and a line casting position in which the fishing line is freely unreeled forward (cast) from the spool 130. The bail reversing device 30 is a device for allocating (inverting) the fishing line guiding mechanism 2 (in particular the second bail support portion 22 thereof) to a line winding position and a line casting position, and stabilizing the mechanism at the respective positions.

Figure 9A:
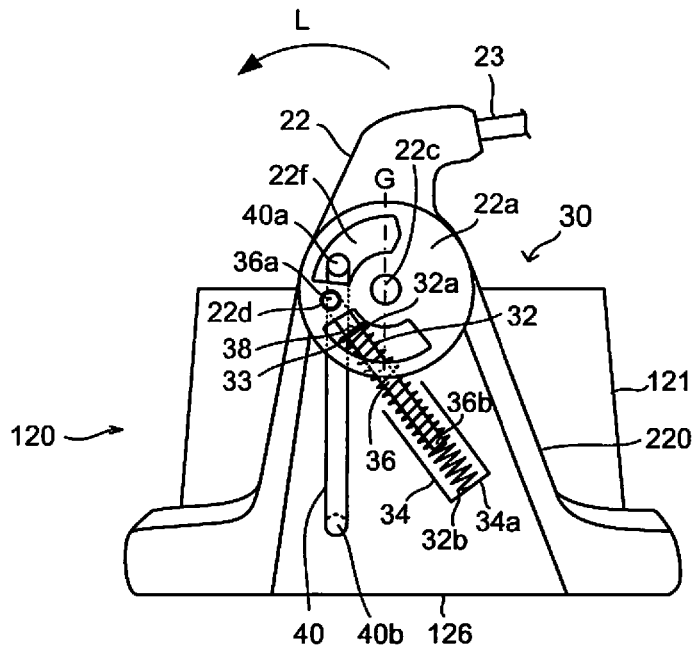
FIG. 9A is a schematic view of the bail reversing device according to the first embodiment of the present invention when in the line winding position.

As shown in FIG. 9A, the bail reversing device 30 comprises a toggle spring 32, a guide rod 36, and a return lever 40.

The first end portion 22a of the second bail support portion 22 is made of zinc, and is coupled to the front end portion of the second rotor arm 220 by a support shaft 22c. An engagement hole 22d that engages with one end 36a of the guide rod 36, and a lever insertion hole 22f in which one end 40a of the return lever 40 is inserted, are provided in the first end portion 22a.

The guide rod 36 is a member that serves to transmit the biasing force of the toggle spring 32 to the second bail support portion 22. The guide rod 36 is made of stainless steel, one end 36a of which is bent at a right angle and engaged with the engagement hole 22d of the first end portion 22a. The guide rod 36 comprises a locking projection 38 that locks one end portion 32a of the toggle spring 32 in front of the bent position. The other end portion 36b of the guide rod 36 is inserted halfway into the toggle spring 32. However, the other end portion 36b of the guide rod 36 does not abut the bottom surface 34a of the spring guide 34 even if the toggle spring 32 is compressed.

Figure 9B:
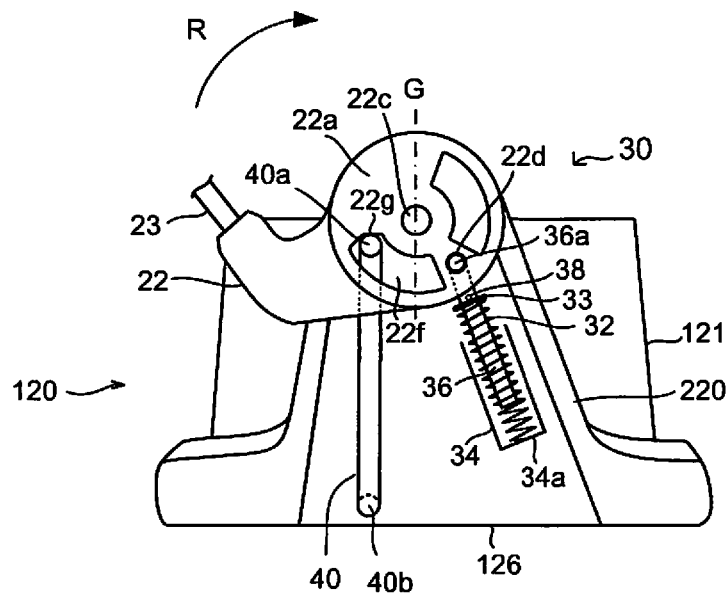
FIG. 9B is a schematic view of the bail reversing device when in the line casting position.

The toggle spring 32 has the role of biasing the guide rod 36. The toggle spring 32 is a coil spring, one end portion 32a of which is locked to the locking projection 38 of the guide rod 36 via a resin plate 33, and the other end portion 32b of which is made of resin and inserted in a spring guide 34 of a bottomed quadrangular prism-shaped vessel, and abutted and supported on the bottom surface 34a of the spring guide 34. The central portion of spring guide 34 is rotatably supported such that the orientation thereof is varied accompanying changes in the orientation of the guide rod 36. In FIGS. 9A and 9B, the spring guide 34 is illustrated such that the inside is visible.

One end portion 36a of the guide rod 36 is engaged with the engagement hole 22d of the first end portion 22a. The guide rod 36 that is biased by the toggle spring 32 thereby biases the first end portion 22a in the forward direction. The first end portion 22a, that is, the second. bail support portion 22, is stabilized in the line winding position or the line casting position by this biasing force.

Figure 10:
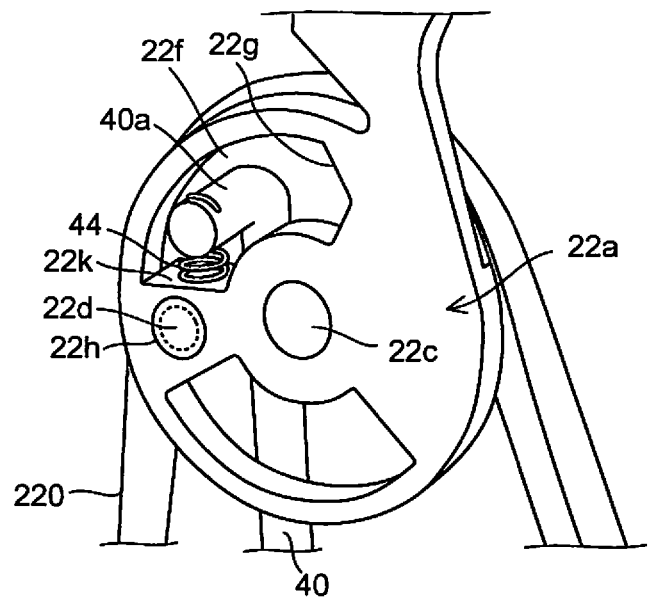
FIG. 10 is a partial view of the bail reversing device according to the first embodiment of the present invention.

Although the guide rod 36 is engaged with the engagement hole 22d of the first end portion 22a, since the guide rod 36 (made of stainless steel) and the first end portion 22a (made of zinc) are different materials, if engaged directly there is the risk that the engagement hole 22d will be corroded due to the difference in the ionization tendency of the two materials, when salt water, etc., intrudes into a gap. Accordingly, as shown in FIG. 10, a cylindrical resin collar (insulating member) 22h is fitted in the engagement hole 22d of the first end portion 22a of the second bail support portion 21. The one end portion 36a of the guide rod 36 is engaged with the engagement hole 22d via this resin collar 22h. The occurrence of electrolytic corrosion is prevented by inserting the resin collar 22h and insulating the two in this manner. Meanwhile, the guide rod 36 is not shown in FIG. 10.

The return lever 40 is a member for transmitting a biasing force for rotating the first end portion 22a of the second bail support portion 22 that is in the line casting position, in the direction to return to the line winding position. As shown in FIG. 9A and FIG. 10, one end portion 40a of the return lever 40 is bent at a right angle and inserted in the lever insertion hole 22f of the first end portion 22a.

The other end portion 40b of the return lever 40 is bent at a right angle to the opposite side of the one end portion 40a. The other end portion 40b of the return lever 40 is positioned forward of the rear end opening 126 of the rotor 120, when the first end portion 22a is in the line winding position. However, as shown in FIG. 9B, the other end portion 40b of the return lever 40 is retracted to the vicinity of the rear end opening 126 of the rotor body portion 121, when the first end portion 22a is in the line casting position. That is, the other end portion 40b of the return lever 40 approaches a chin portion 115 of the reel body 110 (refer to FIG. 2) that faces the rear end opening 126 of the rotor body portion 121.

Figure 11:
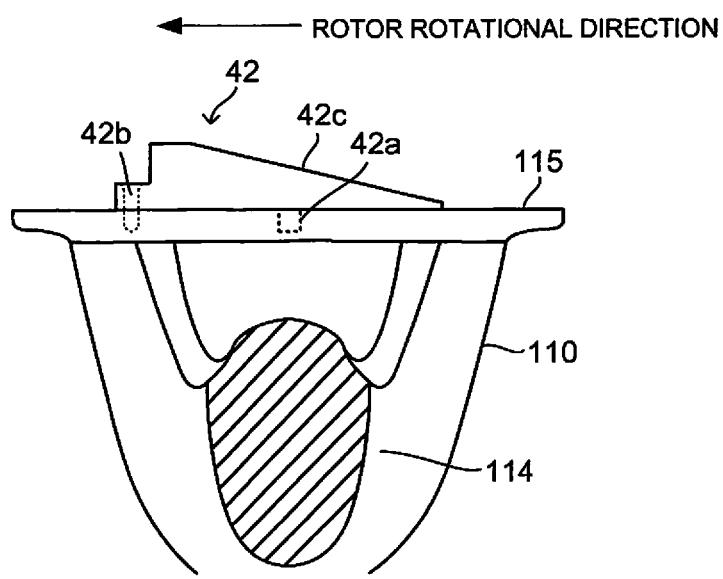
FIG. 11 is a cross sectional view taken along line D-D of FIG. 2.

As shown in FIG. 11, a return lever return unit 42 is disposed to the chin portion 115 of the reel body 110. The return lever return unit 42 is a substantially triangular member in which an inclined surface 42c is formed such that the height thereof becomes higher toward the rotational direction of the rotor 120. A projection 42a is formed on the bottom surface of the return lever return unit 42, and the projection 42a is inserted in a hole to the chin portion 115 of the reel body 110. The return lever return unit 42 is positioned by the projection 42a, and further fixed by a bolt 42b.

In the prior art, a constricted portion is generally formed in the lower part of the return lever return unit, which is fixed by inserting the constricted portion into a notched portion provided to the chin portion from the side. However, this return lever return unit 42 is positioned and fixed by a bolt 42b and a projection 42a formed on the bottom surface. With this configuration, it is possible to simplify the structure around the chin portion 115, which increases the freedom in design of the peripheral members.

As shown in FIG. 11, the return lever return unit 42 is disposed on a chin portion 115 of the reel body 110 at a position to which the rod mounting stage support portion 114 extends.

When trying to manually switch the fishing line guiding mechanism 2 from the line winding position to the line casting position, the user will often hold the fishing line by hooking the line with a finger of the right hand, and move the bail 23 with the left hand to switch the positions. At this time, in order for the user to hook the fishing line with a finger, it is necessary to move the bail 23 in a position where the first rotor arm 210 having the line roller 3 comes to the rod side (the side to which the rod mounting stage support portion 114 is disposed). At this time, if the return lever return unit 42 is on the opposite position of the rod side, the second rotor arm 220 also comes to the opposite position of the rod side; therefore, the return lever 40 that is disposed inside the second rotor arm 220 interferes with the return lever return unit 42, and the bail 23 cannot be moved to the line casting position.

By disposing the return lever return unit 42 at the chin portion 115 at a position to which the rod mounting stage support portion 114 extends, when the user tries to manually switch the fishing line guiding mechanism 2 from the line winding position to the line casting position in a position to which the first rotor arm 210 comes to the rod side, the return lever 40 does not interfere with the return lever return unit 42, and it is possible to switch the positions of the fishing line guiding mechanism 2 without imparting discomfort to the user.

While the one end portion 40a of the return lever 40 is inserted in the lever insertion hole 22f of the first end portion 22a of the second bait support portion 22, when in the line winding position, the one end portion 40a does not abut the side wall of the lever insertion hole 22f, and there is a space that allows a certain degree of freedom for movement. Consequently, for example, when the bail 23 is deformed, there is the possibility that the return lever 40 can be moved backward even if the first end portion 22a is in the line winding position. If the return lever 40 is moved backward in a position in which the first end portion 22*a* is in the line winding position, a possibility arises in which the other end portion 40*b* of the return lever 40 can come into contact with the return lever return unit 42, when contact should not occur.

In order to eliminate such possibilities, the bent one end portion 40*a* of the return lever 40 is biased by a lifting spring (biasing member) 44 made from a coil spring, as shown in FIG. 10. The lifting spring 44 is for biasing the return lever 40 forward such that the return lever 40 is not retracted.

The front end (upper end in FIG. 10) of the lifting spring 44 is locked by being wound to the one end portion 40*a* of the return lever 40, and the rear end (lower end in FIG. 10) is configured to abut the side wall 22*k* of the rear end (lower end in FIG. 10) of the lever insertion hole 22*f*, when in the line winding position. According to this configuration, the lifting spring 44 is capable of biasing the return lever 40 forward (upward in FIG. 10) with respect to the first end portion 22*a* of the second bail support portion 22 when in the line winding position, such that the return lever 40 does not come into contact with the return lever return unit 42.

The operation of the bail reversing device 30 will be described next. As shown in FIG. 9A, when the fishing line guiding mechanism 2 is in the line winding position, the one end portion 36*a* of the guide rod 36 is on the left side of an imaginary line segment G that passes through the center of the support shaft 22*c* of the second bail support portion 22, and is parallel to the longitudinal direction. With the biasing force of the toggle spring 32, the guide rod 36 biases the second bail support portion 22 in the upper left direction of the drawing, and stabilizes the second bail support portion 22 in this position.

When putting the fishing line guiding mechanism 2 in the line casting position in order to cast the fishing line forward, the user holds the bail 23 with a hand and turns the bail in the arrow L direction in FIG. 9A. The second bail support portion 22 is thereby rotated counterclockwise around the support shaft 22*c*. While the biasing force of the toggle spring 32 acts to suppress this rotation, the engagement hole 22*d* (along with the one end portion 36*a* of the guide rod 36 which is engaged therewith) is rotated counterclockwise against the biasing force of the toggle spring 32.

The position where the engagement hole 22*d* is rotated halfway, and the center of the support shaft 22*c*, the engagement hole 22*d*, and the guide rod 36 that is engaged with the engagement hole 22*d* form a straight line, becomes the dead center of the bail reversing device 30 (not shown). When in the dead center position, the biasing force of the toggle spring 32 is received by the support shaft 22*c*, and does not act in a direction to rotate the second bail support portion 22 to either the left or to the right.

When the engagement hole 22*d* is further rotated counterclockwise beyond this dead point (moving rightward in the drawing), the biasing force of the toggle spring 32 then acts in a direction to rotate the second bail support portion 22 in the opposite, counterclockwise direction. The second bail support portion 22 is then rotated counterclockwise to the line casting position shown in FIG. 9B. In this position, the one end portion 36*a* of the guide rod 36 is on the right side of the imaginary line segment G. In addition, the one end portion 40*a* of the return lever 40 is pushed to the front end wall 22*g* of the lever insertion hole 22*f*, and the return lever 40 is moved downward. The other end portion 40*b* of the return lever 40 is positioned in proximity to the chin portion 115 of the reel body 110, which is not shown, as described above.

When the fishing line guiding mechanism 2 is in the line casting position shown in FIG. 9B, if the user turns the handle 140 to wind the fishing line, the rotor 120 is rotated. Then, the other end portion 40*b* of the return lever 40 that rotates along with the rotor 120 abuts the inclined surface 42*c* of the return lever return unit 42 (refer to FIG. 11), and is gradually lifted upward along the inclination of the inclined surface 42*c* following the rotation of the rotor 120. The other end portion 40*a* of the return lever 40 thereby pushes the front end wall 22*g* of the lever insertion hole 22*f* upward in the drawing. Accordingly, the second bail support portion 22 is rotated around the support shaft 22*c*, in the direction shown by the arrow R in FIG. 9B.

While the engagement hole 22*d* is rotated clockwise against the biasing force of the toggle spring 32 at the beginning of rotation, when the engagement hole 22*d* is further rotated and exceeds the dead point, the biasing force of the toggle spring 32 then acts in a direction to rotate the second bail support portion 22 in the clockwise direction. Then, the second bail support portion is stabilized in the line winding position shown in FIG. 9A. By turning the handle 140 in this manner, the fishing line guiding mechanism 2 is automatically set in the line winding position.

In the rotor 120 of a spinning reel 100 for fishing according to the first embodiment described above, while the other configurations are the same, the rotor body portion 121 is more lightweight while maintaining the necessary strength compared to those having a conventional structure in which the wall thickness is uniform without having a thick-tailed portion 127. In addition, the first rotor arm 210 is formed from a flat plane-shaped first support leg 211 and a flat plate-shaped second support leg 213, respectively provided with a first rib 215 and a second rib 216 for reinforcement. Accordingly, while the other configurations are the same, the rotor arm is further reduced in weight while maintaining the necessary strength, compared to those having a conventional structure that does not comprise a first rib 215 and a second rib 216 for reinforcement.

Additionally, the spinning reel 100 for fishing includes a bail reversing device 30 inside the second rotor arm 220 on the opposite side of the first rotor arm 210, which is on the side where the line roller 3 is present. This structure makes it easier to achieve a balance in weight between the first rotor arm 210 and the second rotor arm 220, thereby reducing the weight of the rotor 120.

Specifically, since the first rotor arm 210 does not comprise a bail reversing device 30, the first rotor arm is more lightweight than the second rotor arm 220, which comprises the bail reversing device 30 while the other configurations are the same. Accordingly, it is easier to achieve a rotational balance, even if a thick-walled portion 127 is not disposed on the rotor body portion 121 at the second rotor arm 220 side and a thick-walled portion 127 is disposed only on the rotor body portion 121 at the first rotor arm 210 side. In other words, it is possible to reduce the amount of weight material for adjustment (balance), which is added only to achieve a balance, resulting in a reduction in weight.

As described above, the rotor 120 of a spinning reel 100 for fishing is a rotor that achieves a rotational balance and reduces the weight of the whole while maintaining the necessary strength.

Meanwhile, the configuration to provide a thick-walled portion 127 at the rotor arm 121 on the first rotor arm 210 side, and the configuration to form the first rotor arm 210 from a flat plate-shaped first support leg 211 and a flat plate-shaped second support leg 213 and to respectively provide a first rib 215 and a second rib 216 thereto, may each be selectively executed.

In addition, the configuration to provide a bail reversing device 30 inside the second rotor arm 220 on the opposite side from the line roller 3, the configuration to provide a thick-walled portion 127 at the rotor arm 121 on the first rotor arm 210 side, and the configuration to form the first rotor arm 210 from a flat plate-shaped first support leg 211 and a flat plate-shaped second support leg 213 and to respectively provide a first rib 215 and a second rib 216 thereto, may each be selectively executed, or two or more may be executed in combination.

Second Embodiment

In the first embodiment, a thick-walled portion 127 is formed on the inner side of the cylinder of the rotor body portion 121 on the first rotor arm 210 side, and the thickness of the other portions of the cylinder of the rotor body portion 121 is reduced, to reduce the overall weight of the rotor body portion 121. In the second embodiment, a mode in which the overall weight of the rotor body portion 121A is reduced by another configuration will be described.

Figure 12A:
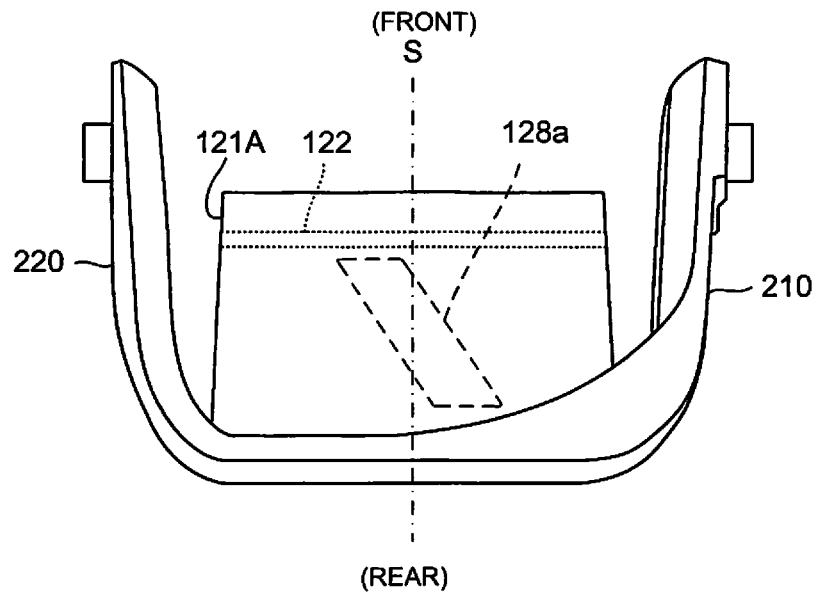
FIG. 12A is a side view of the rotor for a spinning reel for fishing according to a second embodiment of the present invention.
Figure 12B:
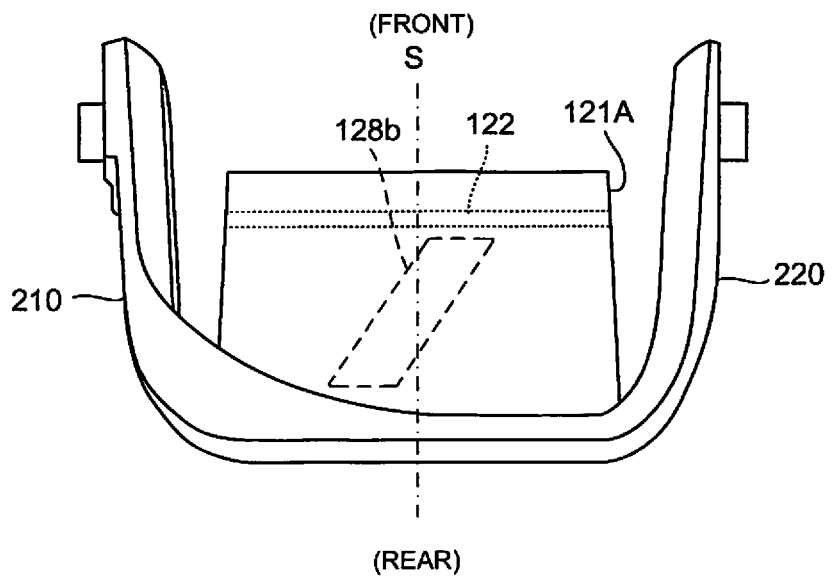
FIG. 12B is a side view seen from an opposite side.

As shown in FIGS. 12A and B, an inclined thick-walled portion 128a (second reinforcement portion) and an inclined thick-walled portion 128b (second reinforcement portion) having thicker walls than the surrounding, which are inclined with respect to the cylinder axis S direction, are provided from the rear to the front of the side surface of the rotor body portion (cylindrical portion) 121A, between the first rotor arm 210 and the second rotor arm 220. Extending inclined with respect to the cylinder axis S direction means extending on the cylinder side surface of the rotor body portion 121A in a partial spiral form (helical arc).

The inclined thick-walled portions 128a and 128b are portions in which the wall thickness is formed thicker than the wall thickness of other portions of the cylinder of the rotor body portion 121A. The inclined thick-walled portions 128a and 128b respectively extend in a spiral form from the rear to the front of the rotor body portion 121A so as to be oriented forward, from the first rotor arm 210 side to the second rotor arm 220 side. The inclined thick-walled portion 128a and the inclined thick-walled portion 128b are formed in plane symmetry to each other, with respect to a surface that includes the cylinder axis S. More specifically, the inclined thick-walled portion 128a and the inclined thick-walled portion 128b are formed in plane symmetry to each other, with respect to a surface that includes the cylinder axis S and that passes the central portion of the first rotor arm 210 and the central portion of the second rotor arm 220.

As described above, since a particularly large load is applied to the first rotor arm 210 side of the rotor body portion 121A, the inclined thick-walled portions 128a and 128b are preferably have such an orientation and arrangement, from the point of strength and rotational balance.

The wall thickness of the cylinder of the rotor body portion 121A, excluding the inclined thick-walled portions 128a, 128b, may be thinner than the wall thickness of cases in which the cylindrical portion of the rotor body portion 121A has a uniform thickness. While it is determined as a trade-off between strength and weight, the wall thickness of the inclined thick-walled portions 125a and 128b is preferably about 1.5 to 3 times the wall thickness of the cylinder portion besides the inclined thick-walled portions 128a and 128b. By disposing inclined thick-walled portions 128a and 128b on the cylinder, and reducing the wall thickness of the other cylindrical portions, it is possible to reduce the overall weight of the rotor body portion 121A while maintaining the necessary strength.

In the second embodiment, the range in which the inclined thick-walled portions 128a and 128b are provided is a range that is on the rear side of the disk portion 122. However, the range in which the inclined thick-walled portions 128a and 128h are provided may be wider, or narrower.

In the second embodiment, inclined thick-walled portions 128a and 128b are formed as the second reinforcement portions; however, a reinforcement material having a higher strength than the cylindrical portion of the rotor body portion 121A may be adhered to the wall of the cylindrical portion as well. In addition, it is also possible to encapsulate a reinforcement material in the wall of the cylindrical portion. Such a reinforcement material is preferably provided inclined with respect to the cylinder axis S.

Meanwhile, it is not necessary to reduce the wall thickness of the cylinder of the rotor body portion 121A on the first rotor arm 210 side and the second rotor arm 220.

A method to provide a thick-walled portion in a direction that is parallel, or perpendicular, to the cylinder axis S direction is also conceivable as a method to reduce the overall thickness of the cylinder of the rotor body portion 121A while maintaining the overall strength by making a portion thereof thick-walled. However, it has been found that providing inclined thick-walled portions 128a and 128b in an oblique direction with respect to the cylinder axis S direction achieves a higher effect of reducing the weight of the rotor body portion 121A while preventing a reduction in the strength of the rotor body portion 121A. Additionally, it has been found that it is effective to reduce the wall thickness across a wide range and to provide a reinforcement portion whereby the wall thickness is increased diagonally.

Modified Example

Figure 13A:
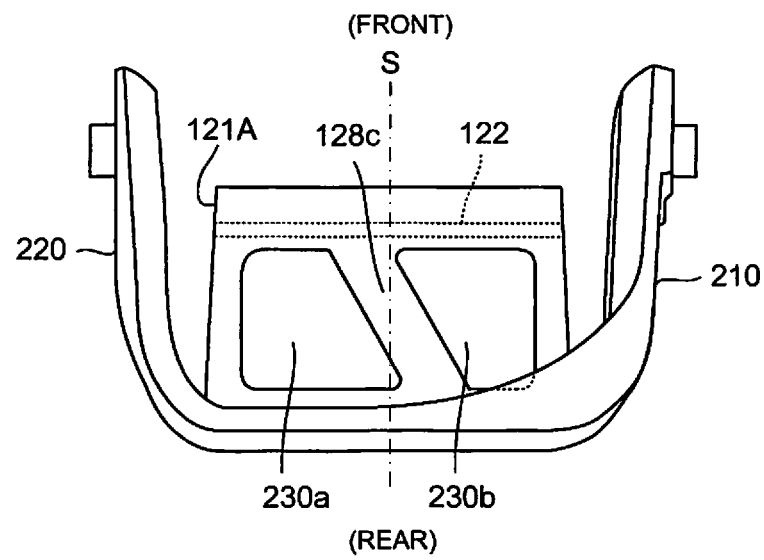
FIG. 13A is a side view of the rotor for a spinning reel for fishing according to a modified example of the present invention.
Figure 13B:
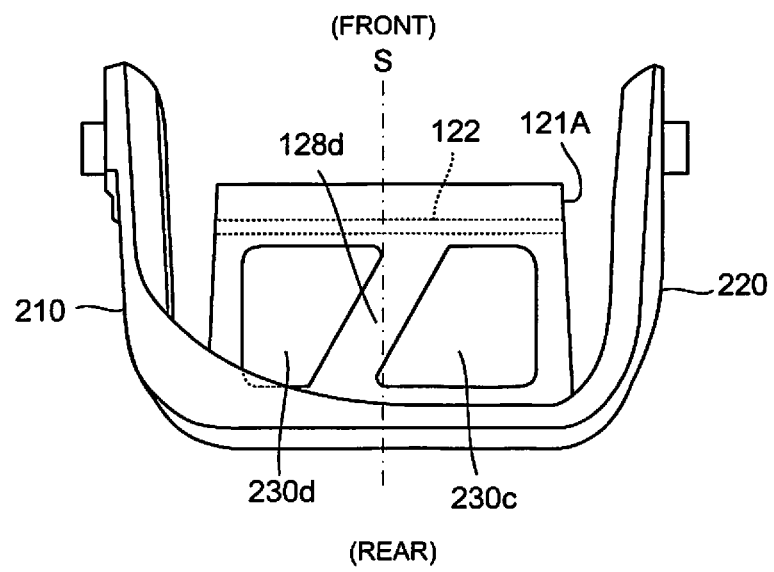
FIG. 13B is a side view seen from an opposite side.

The cylindrical portion of positions adjacent to the inclined thick-walled portions 128a and 128b in the second embodiment (not only the directly adjacent positions, but also including nearby positions) may be (partially) open. For example, as in the rotor body portion 121A shown in FIG. 13A, an opening 230a and an opening 230b are disposed in the cylindrical portion between the first rotor arm 210 and the second rotor arm 220. As shown in FIG. 13B, an opening 230c and an opening 230d are also disposed in the opposite side in the same manner. That is, an inclined reinforcement portion 128c (second reinforcement portion) that extends inclined with respect to the cylinder axis S direction is provided, and an opening 230a and an opening 230b are disposed in adjacent positions thereof. Similarly, an inclined reinforcement portion 128d (second reinforcement portion) that extends inclined with respect to the cylinder axis S direction is provided, and an opening 230c and an opening 230d are provided in adjacent positions thereof. The wall thickness of the inclined reinforcement portions 128c and 128d is thicker than the wall thickness of cases in which the entire rotor body portion 121A has a uniform thickness. The inclined reinforcement portions 128c and 128d have the same role as the inclined thick-walled portions 128a and 128b of the second embodiment.

In the case of this modified example, the wall thicknesses of the portions other than the openings may be the same. In this case, it is possible to form an opening by punching a portion of a cylinder with a uniform wall thickness. In other words, large openings 230a, 230b, 230c and 230d may be disposed in two cylindrical portions between the first rotor arm 210 and the second rotor arm 220 of the rotor body portion 121A, leaving behind inclined reinforcement portions 128c and 128d that extend in a direction that is inclined with respect to the cylinder axis S (longitudinal) direction. Meanwhile, it is preferable not to provide openings in the cylindrical portion to which the first rotor arm 210 is attached and the cylindrical portion to which the second rotor arm 220 is attached from the point of view of strength. The shape of the opening is substantially trapezoidal in the example shown in FIGS. 13A and 13B, but the shape is not limited to a trapezoid. However, when considering the rotational balance, the shape is preferably formed in symmetry with respect to a plane that includes the cylinder axis S and that passes the central portion of the first rotor arm 210 and the central portion of the second rotor arm 220.

By partially opening the cylindrical portions besides the inclined thick-walled portions 128a and 128b in the second embodiment in this manner, it is possible to reduce the weight of the rotor body portion 121A as a whole.

Conventionally, a method is known in which multiple small openings (for example circular openings) are used to reduce the weight of a plate-like member. However, it has been found that having openings across a wide range and to provide diagonal reinforcement portions to the openings is more effective to reduce the overall weight, while maintaining the necessary strength.

Meanwhile, the thick-walled portion 127 of the first embodiment, the inclined thick-walled portions 128a and 128b of the second embodiment (or the inclined reinforcement portions 128c and 128d of the modified example) for reducing the weight of the rotor body portion 121 may each be selectively executed, or two or more may be executed in combination.

Several embodiments of the present invention and modified examples thereof were described above. However, the present invention is not limited to these embodiments and modified examples. In addition, of the characterizing configurations described above, one may be selectively (individually) executed, or a plurality of configurations may be combined, giving consideration to the rotational balance.

What is claimed is:

1. A rotor for a spinning reel for fishing, comprising:
a cylindrical portion having a rear end opening;
a first rotor arm extending forward from an outer peripheral portion of the cylindrical portion and configured to couple to a first bail support portion including a line roller;
a second rotor arm disposed at a position opposing the first rotor arm, extending forward from the outer peripheral portion of the cylindrical portion, and configured to couple to a second bail support portion holding an end of a bail that extends from the first bail support portion; and
a reinforcement portion having a wall portion that is thicker than a surrounding portion, the reinforcement portion disposed on an inner peripheral portion of the cylindrical portion in a position at which the first rotor arm is disposed.

2. The rotor for a spinning reel for fishing recited in claim 1, wherein
an inner radius of the reinforcement portion is smaller than an inner radius of the cylindrical portion.

3. The rotor for a spinning reel for fishing recited in claim 1, wherein
the reinforcement portion is symmetrically formed in a circumferential direction of the cylindrical portion.

4. The rotor for a spinning reel for fishing recited in 1, further comprising
a bail reversing device configured to allocate a bail to a line winding position and a line casting position, the bail reversing device being disposed inside the second rotor arm.

5. A rotor for a spinning reel for fishing, comprising:
a cylindrical portion having a rear end opening;
a first rotor arm extending forward from an outer peripheral portion of the cylindrical portion and configured to couple to a first bail support portion including a line roller;
a second rotor arm disposed at a position opposing the first rotor arm; extending forward from the outer peripheral portion of the cylindrical portion, and configured to couple to a second bail support portion holding an end of a bail that extends from the first bail support portion; and
a reinforcement portion extending inclined with respect to an axis direction of the cylindrical portion only partially circumferentially around the cylindrical portion, on a side surface of the cylindrical portion.

6. The rotor for a spinning reel for fishing recited in claim 5, wherein
the reinforcement portion is a first reinforcement portion, and
an opening is adjacent to a second reinforcement portion on the side surface of the cylindrical portion.

7. The rotor for a spinning reel for fishing recited in claim 5, wherein
the reinforcement portion is one of two reinforcement portions formed in plane symmetry with respect to a surface comprising the cylinder axis.

8. A rotor for a spinning reel for fishing, comprising:
a cylindrical portion having a rear end opening;
a first rotor arm extending forward from an outer peripheral portion of the cylindrical portion and configured to couple to a first bail support portion including a line roller, the first rotor arm includes a support leg;
a second rotor arm disposed at a position opposing the first rotor arm, extending forward from the outer peripheral portion of the cylindrical portion and configured to couple to a second bail support portion holding an end of a bail that extends from the first bail support portion; and
a reinforcement portion extending from at least one side of the first rotor arm, and forming an L-shaped cross sectional structure with the support leg.

9. The rotor for a spinning reel for fishing recited in claim 8, wherein
the support leg is one of two support legs; the reinforcement portion is one of two reinforcement portions each of two reinforcement portions extending from a side of a respective one of the two support legs to the outer peripheral portion of the cylindrical portion, and each of the reinforcement portions forms an L-shaped cross section along with the respective one of the support legs.

* * * * *